United States Patent [19]

Bland et al.

[11] Patent Number: 5,215,691
[45] Date of Patent: Jun. 1, 1993

[54] METHOD OF FORMING A COEXTRUDED FOAM COMPOSITE

[75] Inventors: David G. Bland, Knoxville, Tenn.; Joseph J. Conte; Susan K. Moeller, both of Newark, Ohio

[73] Assignee: The Dow Chemical Company, Midland, Mich.

[21] Appl. No.: 577,723

[22] Filed: Sep. 5, 1990

[51] Int. Cl.⁵ .............................................. B29C 67/22
[52] U.S. Cl. ...................................... 264/45.9; 264/53; 264/54
[58] Field of Search ................ 264/45.9, 46.1, 50, 264/51, 53, 54, DIG. 14

[56] References Cited

U.S. PATENT DOCUMENTS

| | | | |
|---|---|---|---|
| 3,557,265 | 1/1971 | Chisholm et al. | 264/46.1 |
| 4,155,965 | 5/1979 | Allada | 264/DIG. 9 |
| 4,221,624 | 9/1980 | Eslinger et al. | 264/45.9 |
| 4,657,811 | 4/1987 | Boyd et al. | 264/45.9 |
| 4,746,477 | 5/1988 | Wecker et al. | 264/45.9 |
| 4,828,772 | 5/1989 | Lopatin et al. | 264/51 |
| 4,889,669 | 12/1989 | Suzuki | 264/45.9 |
| 5,049,327 | 9/1991 | Hara et al. | 264/45.5 |

Primary Examiner—Allan R. Kuhns

[57] ABSTRACT

A method for preparing composite foam articles by the coextrusion of at least two interdigitated layers in abutting relationship to each other, wherein at least one layer of composite article comprises at least one expanded thermoplastic resinous material. At least one physical expansion agent is incorporated into at least one of the layers under a pressure sufficient to keep the expansion agent quiescent and the individual melt streams are combined and interdigitated into a composite layered stream. The composite layered stream is expressed while the operating pressures and temperatures of individual melt streams are controlled to provide a coextrusion product having a stable foam structure.

18 Claims, 1 Drawing Sheet

METHOD OF FORMING A COEXTRUDED FOAM COMPOSITE

BACKGROUND OF THE INVENTION

The present invention relates to composites made from at least one layer of foam material and another layer of either foam or film material. Such composites are currently made by lamination. For example, a layer of polyethylene film will be laminated with an adhesive to a layer of polystyrene foam in order to create a foam composite product which has greater board strength than would a foam layer alone.

Such laminating operations are expensive. Large sheets of polymeric material have to be stored, moved to an assembly area, coated with adhesives and laminated together. Handling can become especially difficult when laminating three or four layers of polymeric foam or foam and film together.

Composites of different films are often made by coextrusion. Coextrusion greatly reduces handling problems and expense, since the films which are to be joined in a composite are simultaneously extruded from the base resin. The only large sheets which have to be handled are the finished product.

Attempts have been made to adapt known coextrusion processes to the production of composite structures comprising at least two distinct layers, at least one of which comprises a foamed layer. For example, U.S. Pat. No. 3,557,265 discloses the coextrusion of film layers, foam layers and foam-film layers with the foam layers being extruded from a feed comprising an expandable thermoplastic resin, i.e., the resin contains blowing agents when originally heat-plastified. Thus, the '265 patent feeds a first polymer containing a blowing agent into a heater/extruder where it is melted and conveyed to a feedblock and die and interdigitated with another polymer melt stream. It is difficult to control process temperatures during the heat plastification of the polymer-blowing agent feed without some foaming taking place. Generally, the attempts to extend coextrusion technology to include coextrusion of foam-foam or foam-film layers have given mixed results. While commercially acceptable composites can be produced by coextrusion, the method is not consistently reproducible with the same production run giving not only acceptable product but also significant amounts of unacceptable product which must be scrapped. In addition, the coextruded composites so obtained quite often have a wavy, corrugated appearance instead of the more eminently desired smooth outer surface. Notwithstanding such problems, there is a strong desire to develop coextrusion of foam-foam and foam-film composites because of the significant cost savings which coextrusion promises.

SUMMARY OF THE INVENTION

The present invention is founded upon the discovery that a foamed laminate comprising at least one foam layer and at least one adjacent foam or film layer can be successfully consistently coextruded by introducing a blowing agent into a thermoplastic resin composition while the resin is in a heat-plastified or molten state under a pressure which is sufficiently high to prevent its activation, and by carefully controlling the die pressure and the processing temperature of the polymeric materials which make up the foam and adjacent foam or film layers as the polymeric materials enter the coextrusion die wherein the individual streams are combined into a composite stream of interdigitated layers, at a constant feed rate. The pressure at the extrusion die must be sufficiently high that, (1) the foam layer(s) is (are) prevented from expanding too far back in the coextrusion die; and (2) in combination with control of the temperature of the extrudable streams, the pressure must be such as to produce and maintain a stable foam structure. The temperatures of the polymeric material forming the first foam layer and the polymeric material forming the adjacent foam or film layer are controlled so that the temperature at the interface of adjacent layers is neither so hot as to collapse the first foam layer either in the coextrusion die or after it exits the coextrusion die, nor so cold as to restrict expansion of the foam layer. This requires that the melting temperature of the second polymeric material must be lower than the desired foaming temperature for the first foamed polymeric layer.

The method of the invention for preparing a foam article or structure comprising at least two individual layers, at least one of said layers comprising a foamed or expanded cellular thermoplastic resinous material, comprises: preparing at least two separate melt streams of the same or different thermoplastic resinous materials, said thermoplastic resinous materials being characterized by the substantial absence of a blowing or expansion agent; incorporating into at least one of said separate melt streams at least one expansion agent, under a pressure which is sufficient to inhibit expansion of said melt; combining said separate melt streams to form a composite stream having said separate melt streams interdigitated; expressing said composite stream and causing said melt stream having expansion agents incorporated therein to expand; and characterized in that the temperature and pressure of each melt stream is controlled to (1) prevent the foam layers from expanding prior to expressing, (2) to obtain a stable foam structure, and (3) to maintain the temperature at the interface of any two adjacent layers, at least one of said adjacent layers comprising a foam layer, at a level that the interface temperature is not so hot as to collapse the foam layer nor so cold as to inhibit expansion.

These and other objects, advantages and features of the invention will be more fully understood and appreciated by reference to the description of the preferred embodiment and appended drawings.

DESCRIPTION OF THE PREFERRED EMBODIMENT

Figure 1:
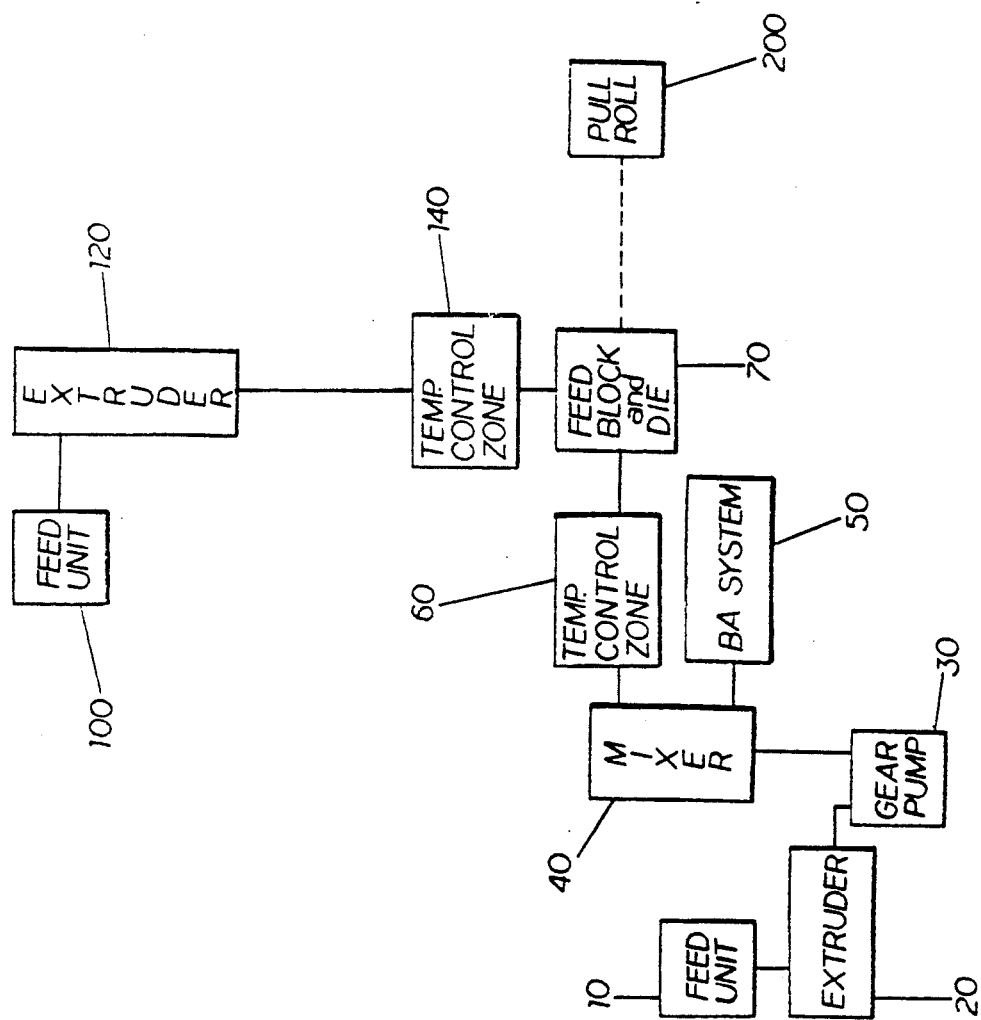
FIG. 1 is a block diagram of the apparatus used in the present invention.

In a preferred embodiment of the present invention, there is provided a method for preparing foam articles or structures comprising at least two layers, preferably at least five layers and most preferably from 10 to 1000 layers, said layers being in abutting relationship and fused to each other, wherein alternating layers comprise a solid, non-expanded thermoplastic resinous material having a thickness of 10 microns to 10 mils, and the remaining layers comprise an expanded cellular thermoplastic resinous foam material, the layers being interdigitated and in generally parallel relationship.

The foam structures of the invention are produced by coextrusion of at least two streams of the same or dissimilar thermoplastic materials. Coextrusion or simultaneous extrusion of two or more synthetic resinous materials is well-known in the art and has been used for preparing sheet or film containing many layers, for example, 50, 100 or several hundred layers. A method and apparatus for such extrusion is disclosed in U.S. Pat. Nos. 3,565,985, 3,557,265 and 3,884,606, herewith incorporated by reference. Coextrusion as employed in this invention can be broadly described as a method for preparing a composite stream of interdigitated diverse synthetic resinous materials wherein at least one of the resinous materials comprises a thermoplastic resinous composition containing at least one blowing or expansion agent, comprising providing at least a first stream of heat-plastified synthetic resinous material and a second stream of heat-plastified thermoplastic material, neither of which streams contain blowing or expansion agents, adding to at least one of the heat-plastified streams at least one blowing agent under a pressure which is sufficient to substantially inhibit activity of the blowing agent, dividing each of the streams into a plurality of first substreams and a plurality of second substreams, respectively; combining the substreams to form a composite stream having the first substreams and the second substreams interdigitated, and forming the stream into a desired configuration having at least one major surface wherein the layers of the composite stream lie generally parallel to a major surface of the desired configuration. The division of the individual streams of heat-plastified thermoplastic into a plurality of substreams and the combination of the substreams into a composite stream of interdigitated layers is effected in a layer multiplying-combining means such as feedblock and die assembly shown in FIGS. 2-4, 6 and 7 of U.S. Pat. No. 3,557,265, supra.

In FIG. 1, there is illustrated a schematic of an apparatus employed in accordance with a method of the invention, generally designated by the reference numeral 10. The apparatus 10 comprises in combination a first extruder 20 having a feed unit 10, a gear pump 30 in flow communication with extruder 20, and a mixer 40 in flow communication with gear pump 30. Mixer 40 is also in flow communication with blowing agent system 50 and temperature control zone 60, with temperature control zone 60 being in flow communication with feedblock and die assembly 70. Apparatus 10 also includes a second extruder 120 having a feed unit 100, with extruder 120 being in flow communication with temperature control zone 140, which is in flow communication with feedblock and die 70. In an alternative embodiment, especially where there is a desire or need to include a blowing agent with the polymer feed from extruder 120, there can be included a gear pump and a mixer, not shown, substantially identical to gear pump 30 and mixer 40, located between extruder 120 and temperature control zone 140 and in flow communication with each of the extruder and the temperature control zone and also in flow communication with a blowing agent system, also not shown, substantially identical to blowing agent system 50. It will be readily apparent that blowing agent system 50 can be readily adapted to provide blowing agent into the heat-plastified stream from extruder 120. Feedblock and die assembly 70 has a discharge or outlet opening from which the coextruded product is expressed, picked up by pull rolls 200 and then either cut and stacked, or if thin enough, wound on a take up roll.

In operation of the apparatus in accordance with the preferred embodiment of the invention, a thermoplastic resinous material is fed from feed unit 10 into extruder 20 where it is heat-plastified, and thence to mixer 40 wherein a physical or chemical blowing agent is added under pressure to the molten polymer from blowing agent addition system 50. Preferably, extruder 20 extrudes the molten polymer to gear pump 30 which is operated at a fixed rate of speed to provide a constant feed rate of molten polymer to mixer 40. The blowing agent is added to the molten polymer under a pressure which is sufficient to substantially inhibit blowing of the molten polymer during the addition and blending of the physical blowing agent with the molten polymer. The resulting molten polymer-blowing agent blend is then conveyed to temperature control zone 60 and then forced into the feedblock and die assembly 70. As shown in FIG. 1, the second layer to be coextruded with the foam layer is a film. Polymeric material is fed from feed unit 100 into extruder-melter 120 and extruded to temperature control zone 140 and then forced into the feedblock and coextrusion die assembly 70. The coextruded product comprising the foam layer and its interdigitated film layer is pulled out by pull rolls 200, with the foaming of the expandable composition taking place as the coextruded laminate issues from the die.

The coextrusion dies and apparatus shown in FIG. 1 are conventional and well-known to those skilled in the foam extrusion art and those skilled in the coextrusion art. The coextrusion die feedblocks include passages which maintain the individual polymer compositions separate from each other until they exit from the feedblock and become interdigitated one with another. As described more fully in U.S. Pat. No. 3,557,265, feedblock and die assembly 70 comprise a manifold, a distribution block and an extrusion slot or orifice. The manifold includes at least two major passageways, one of which is in communication with temperature control zone 60, and one of which is in communication with temperature control zone 140. The distribution block includes a plurality of passageways, some of which provide communication between one of the major passageways of the manifold and the extrusion opening and others which provide communication between another of the major passageways of the manifold and the extrusion opening. The heat-plastified resinous compositions flowing into the manifold passageways from temperature control zones 60 and 140 are separated into a plurality of substreams in the passageways of the distribution block. The passageways of the distribution block are so constructed and arranged that they alternate in the distribution block and provide a composite interdigitated stream of the material flowing through the major passageways of the manifold to the extrusion opening.

Die pressure is controlled through the thickness, width and shape of the coextrusion die slot, in proportion to the blowing agent concentrations, the type of blowing agents used, the temperature of the polymeric materials being coextruded and the gel flow rate. These relate parameters are determined empirically for each polymeric system being coextruded. Thus, a degree of experimentation is required, particularly when dealing with new systems whose characteristics are unknown, as is well-known to those skilled in the foam extrusion and film extrusion arts.

More particularly, the pressure at the exit die slot is adjusted to a pressure range at which a stable foam structure is obtained. At his point and time, both the temperature of the expandable layer and the temperature of the other or film layer are regulated at the temperature control zones 60 and 140 to ensure that a compatible temperature is obtained at the interface between adjacent layers of polymeric materials. The temperature at the interface is adjusted so that it will neither cause the foam cells immediately adjacent the interface to collapse nor will it inhibit foaming of the expandable or foam composition. Because the layers which comprise the composite are so thin, heat transfer from the hotter layer to the cooler layer is substantially simultaneous and thus a relatively precise temperature control of the interface temperatures is necessary. Generally speaking, it has been found that the processing temperature for the foam composition should be in the range from 1.1 to 2.75, preferably 1.2 to 2.5 times, on the centigrade scale, the melt temperature of the expandable or foamable composition, with the processing temperature of the film-forming polymer being in the range from 0.75 to 2, preferably 0.9 to 1.8 times, on the centigrade scale, the processing temperature of the expandable polymer composition. In addition, the melt temperature of the respective polymers must be lower than the processing temperature. The melt temperature of any of the melt streams may be modified when necessary by blending plasticizers, such as dioctyl phthalate, with the melt stream.

The processing pressure must be high enough to provide a stable foam at the extrusion slot, with the upper pressure being relatively unimportant. In other words, the important pressure parameter is that it must be sufficiently high to insure that a stable foam structure is obtained.

Substantially any thermoplastic polymeric material which can be formed into a film or which can be blown, i.e., foamed, can be employed in the practice of the invention including polyolefins such as polypropylene, polyethylene, and polybutalene, polyvinylchloride, polystyrene, ethylcellulose, poly(vinylchloride)-vinylidene chloride, polymethylmethacrylate and the like. These polymers can be used either as an expandable polymeric composition, or a film-forming composition, or the same polymeric material can be employed for each purpose, that is, a polystyrene can be employed as an expandable polymer on the one hand and as a film-forming polymer on the other hand at one and the same time.

It is an important aspect of this invention that substantially any of the known blowing agents can be employed, including gaseous materials, volatile liquids and chemical agents which decompose into a gas and other byproducts. Representative blowing agents include, without limitation thereto, nitrogen, carbon dioxide, air, methyl chloride, ethyl chloride, pentane, isopentane, perfluoromethane, chlorotrifluoromethane, dichlorodifluoromethane, trichlorofluoromethane, perfluoroethane, 1-chloro-1,1-difluoroethane, chloropentafluoroethane, dichlorotetrafluoroethane, trichlorotrifluoroethane, perfluoropropare, chloroheptafluoropropane, dichlorohexafluoropropane, perfluorobutane, chlorononafluorobutane, perfluorocyclobutane, azodicarbonamide, azodiisobutyronitrile, benzenesulfonhydrazide, 4,4-oxybenzene sulfonyl-semicarbazide, p-toluene sulfonyl semicarbazide, barium azodicarboxylate, N,N'-dimethyl-N,N'-dinitrosoterephthalamide, and trihydrazino triazine. Currently, the partially halogenated hydrocarbons are preferred blowing agents. Generally, the blowing agent will be incorporated into the resin composition which is to be foamed in amounts ranging from 1 to 100 parts by weight of blowing or expansion agent per 100 parts of polymer. It has been found to be advantageous to add small amounts, say 0.1 to 1 part of expansion agent per 100 parts of polymer, to film-forming compositions to improve compatibility and adhesion between the foam and film layers. Film quality is also improved by practicing this variant. The blowing agent must be incorporated into its melt stream under a pressure which is sufficient to inhibit its activation, that is, to inhibit foaming of the melt stream during the incorporation of the expansion agent and subsequent processing of the composition until the stream is expressed through the coextrusion die. Generally, this pressure should be at least 500 psig and is preferably at least 1000 psig.

Additives which are commonly incorporated into expandable polymer compositions, such as catalysts or accelerators, surfactants, flame retardant additives, porosity control agents, antioxidants, colorants, pigments, fillers and the like can be incorporated into the compositions of the invention. Such additives will generally be used in conventional amounts. In a particularly preferred embodiment, it has been found that incorporating from 0.1 to 25, preferably 1 to 20 and most preferable 5 to 15 percent by weight of carbon black into the extrudable polymer compositions, especially those polymer compositions which contain no expansion agent or only a small property-improving amount of expansion agent provides products having an enhanced insulation value.

The following examples are presented to illustrate the invention. In these examples, all amounts are in parts by weight unless otherwise indicated. The blowing or expansion agents employed are further identified as follows:

F-114 : dichlorotetrafluoroethane;
F-12 : dichlorodifluoroethane;
F-113 : trichlorotrifluoroethane;
F-113 : trichlorofluoromethane.

Foam-film composites in the following examples were prepared according to the schematic of FIG. 1, with the composite layered structure being extruded through a rectangular die which has the dimensions (in inches) indicated in the individual examples. Expansion of the blowing agent-containing layers begins substantially immediately as the layered structure is expressed through the die opening. Very good composites were obtained in each case. In all cases, the blowing agents were introduced into its heat-plastified resinous host material at a pressure of at least 1000 psig. The reported temperatures of the foam and film layers are monitored at temperature control zones 60 and 140 for the foam layer and film layer compositions, respectively. The pressure is the back pressure on the composite stream at the extrusion die and thus the system pressure.

EXAMPLE 1

A foam-film laminate was prepared employing, as the film-forming polymer, a polystyrene having a melting temperature of 98° C. and a melt flow index of 6.0 to 9.0; with the identical polystyrene being employed as the foam-forming polymer. A five-layer foam-film structure having 3 film layers and 2 foam layers was prepared in each run.

| Run | 1-1 | 1-2 | 1-3 | 1-4 | 1-5 | 1-6 | 1-7 |
|---|---|---|---|---|---|---|---|
| Film Layer #/hr | 0.77 | 0.77 | 0.77 | 1.9 | 0.17 | 0.77 | 0.77 |
| Temp., °C. | 203 | 210 | 210 | 210 | 210 | 209 | 200 |
| Foam Layer #/hr | 4.2 | 4.2 | 4.2 | 4.2 | 4.2 | 4.2 | 4.2 |
| Blowing Agent | F-114 | F-114 | F-114 | F-114 | F-114 | F-114 | F-114 |
| #/hr | 0.25 | 0.45 | 0.3 | 0.3 | 0.3 | 0.3 | 0.35 |
| Temp., °C. | 176 | 176 | 153 | 153 | 153 | 147 | 139 |
| Pressure psig | 970 | 580 | 1180 | 1180 | 1180 | 1330 | 1350 |
| Die Thickness | 0.1 | 0.1 | 0.1 | 0.1 | 0.1 | 0.1 | 0.1 |
| Die Width | 0.25 | 0.25 | 0.25 | 0.25 | 0.25 | 0.25 | 0.25 |

EXAMPLE 2

A foam-film structure having 3 film and 2 foam layers was prepared, employing a low density polyethylene having a melt temperature of 104° C. and a melt flow index of 2.0 as both the film-forming and foam-forming resinous material. The film layer was colored with carbon black.

| Run | 2 |
|---|---|
| Film Layer #/hr | 3.0 |
| Temp., °C. | 205 |
| Foam Layer #/hr | 4.0 |
| Blowing Agent | F-114 |
| #/hr | 0.8 |
| Temp., °C. | 171 |
| Pressure psig | 890 |
| Die Thickness | 0.1 |
| Die Width | 0.25 |

EXAMPLE 3

Foam-film structures were prepared employing, as the film-former, a blend of equal parts by weight low density polyethylene having a melt temperature of 104° C. and a melt flow index of 12.0 and ethylene (72%)-vinylacetate (28%) copolymer having a melt temperature of 82° C. and a melt flow index of 6.0 in run 3-1, with the same resins being blended in a ratio of ten parts of polyethylene per part of ethylene-vinylacetate copolymer in runs 3-2 through 3-8. The foam-forming resinous material was the same polystyrene resin employed in the runs of Example 1. Structures 3-1 through 3-6 contained 3 film layers and 2 foam layers, with 3-7 and 3-8 containing 6 film layers and 4 foam layers. In this and all other examples, the 10 layer structures were film-foam-film-foam-film-film-foam-film-foam-film. All 5 layer structures were film-foam-film-foam-film.

EXAMPLE 4

Five-layer film-foam structures were prepared employing low density polyethylene having a melt temperature of 104° C. and a melt flow index of 12.0 as the film-forming resin. The foam-forming resin was the same polystyrene material employed in Example 1.

| Run | 4-1 | 4-2 | 4-3 |
|---|---|---|---|
| Film Layer #/hr | 0.8 | | 0.57 |
| Temp., °C. | 131 | 135 | 135 |
| Foam Layer #/hr | 2.47 | 2.5 | 2.5 |
| Blowing Agent | F-12 | F-12 | F-12 |
| #/hr | 0.3 | 0.3 | 0.3 |
| Temp., °C. | 137 | 136 | 137 |
| Pressure psig | 1600 | 1500 | 1600 |
| Die Thickness | 0.1 | 0.1 | 0.1 |
| Die Width | 0.25 | 0.25 | 0.25 |

EXAMPLE 5

Five-layer film-foam structures were prepared employing a polystyrene-polybutadiene high impact graft polymer having a melt temperature of 103° C. and a melt flow index of 2.7 as the film-forming polymer. The foam-forming resin was the same polystyrene material employed in Example 1.

| Run | 5-1 | 5-2 |
|---|---|---|
| Film Layer #/hr | 0.53 | 0.37 |
| Temp., °C. | 213 | 213 |
| Foam Layer #/hr | 2.0 | 2.0 |
| Blowing Agent | F-12 | F-12 |
| #/hr | 0.18 | 0.18 |
| Temp., °C. | 150 | 147 |
| Pressure psig | 1400 | 1300 |
| Die Thickness | 0.1 | 0.1 |
| Die Width | 0.25 | 0.25 |

| Run | 3-1 | 3-2 | 3-3 | 3-4 | 3-5 | 3-6 | 3-7 | 3-8 |
|---|---|---|---|---|---|---|---|---|
| Film Layer #/hr | 1.3 | 0.8 | 1.6 | 2.5 | 3.2 | 4.0 | 2.0 | |
| Temp., °C. | 191 | 154 | 139 | 154 | 154 | 152 | 154 | 160 |
| Foam Layer #/hr | 4.2 | 10.0 | 10.0 | 10.0 | 10.0 | 10.0 | 5.0 | 5.0 |
| Blowing Agent | F-114 | F-12 | F-12 | F-12 | F-12 | F-12 | F-12 | F-12 |
| #/hr | 0.35 | 1.2 | 1.2 | 1.2 | 1.2 | 1.2 | 0.6 | 0.6 |
| Temp., °C. | 140 | 130 | 130 | 130 | 130 | 130 | 132 | 132 |
| Pressure psig | 1310 | 1910 | 1990 | 1950 | 1940 | 1990 | 2480 | 2290 |
| Die Thickness | 0.1 | 0.1 | 0.1 | 0.1 | 0.1 | 0.1 | 0.1 | 0.1 |
| Die Width | 0.25 | 1.0 | 1.0 | 1.0 | 1.0 | 1.0 | 1.0 | 1.0 |

EXAMPLE 6

Five-layer film-foam structures were prepared employing a styrene-acrylonitrile copolymer having a melt temperature of 108° C. and a melt flow index of 8.0 to 13.0 as the film-forming polymer. The foam-forming resin was the same polystyrene material employed in Example 1.

| Run | 6-1 | 6-2 |
|---|---|---|
| Film Layer #/hr | 0.26 | 0.31 |
| Temp., °C. | 254 | 252 |
| Foam Layer #/hr | 2.0 | 2.0 |
| Blowing Agent #/hr | F-12 0.16 | F-12 0.16 |
| Temp., °C. | 147 | 147 |
| Pressure psig | 1340 | 1200 |
| Die Thickness | 0.1 | 0.1 |
| Die Width | 0.25 | 0.25 |

EXAMPLE 7

Five-layer film-foam structures were prepared employing the high impact graft polymer of Example 5 as the film-forming resin and a polycarbonate resin having a melt temperature of 150° C. and a melt flow index of 22 as the foam-forming resin.

| Run | 7-1 | 7-2 |
|---|---|---|
| Film Layer #/hr | 0.75 | 0.75 |
| Temp., °C. | 221 | 221 |
| Foam Layer #/hr | 2.5 | 2.5 |
| Blowing Agent #/hr | F-113 0.31 | F-113 0.31 |
| Temp., °C. | 224 | 213 |
| Pressure psig | 2200 | 3000 |
| Die Thickness | 0.1 | 0.1 |
| Die Width | 0.25 | 0.25 |

EXAMPLE 8

Ten-layer film-foam structures were prepared using a blend of 10 parts low density polyethylene having a melt temperature of 104° C. and a melt flow index of 35 and one part ethylene (77%)-vinylacetate (23%) copolymer having a melt temperature of 77° C. and a melt flow index of 5.5 as the film-forming resin and the polystyrene material of Example 1 as the foam-forming resin.

| Run | 8-1 | 8-2 |
|---|---|---|
| Film Layer #/hr | 1.0 | 0.6 |
| Temp., °C. | 143 | 138 |
| Foam Layer #/hr | 7.5 | 5.0 |
| Blowing Agent #/hr | F-12 0.75 | F-11 0.6 |
| Temp., °C. | 128 | 131 |
| Pressure psig | 2070 | 2080 |
| Die Thickness | 0.15 | 0.15 |
| Die Width | 1.0 | 1.0 |

EXAMPLE 9

Ten-layer film-foam structures were prepared using a low density polyethylene having a melt temperature of 104° C. and a melt flow index of 2.0 as the film-forming resin and the polystyrene material of Example 1 as the foam-forming resin.

| Run | 9-1 | 9-2 | 9-3 |
|---|---|---|---|
| Film Layer #/hr | 2.0 | 1.0 | 0.6 |
| Temp., °C. | 149 | 138 | 149 |
| Foam Layer #/hr | 7.5 | 7.5 | 5.0 |
| Blowing Agent #/hr | F-12 0.75 | F-12 0.75 | F-11 0.6 |
| Temp., °C. | 124 | 128 | 131 |
| Pressure psig | 2320 | 2470 | 2380 |
| Die Thickness | 0.15 | 0.15 | 0.15 |
| Die Width | 1.0 | 1.0 | 1.0 |

EXAMPLE 10

Ten-layer film-foam structures were prepared using ethylene (77%)-vinylacetate (23%) copolymer having a melt temperature of 77° C. and a melt flow index of 5.5 as the film-forming resin and the polystyrene material of Example 1 as the foam-forming resin.

| Run | 10-1 | 10-2 |
|---|---|---|
| Film Layer #/hr | 1.0 | 0.6 |
| Temp., °C. | 141 | 149 |
| Foam Layer #/hr | 7.5 | 5.0 |
| Blowing Agent #/hr | F-12 0.75 | F-11 0.6 |
| Temp., °C. | 128 | 131 |
| Pressure psig | 2310 | 2190 |
| Die Thickness | 0.15 | 0.15 |
| Die Width | 1.0 | 1.0 |

EXAMPLE 11

Ten-layer film-foam structures were prepared using a blend of 10 parts low density polyethylene having a melt temperature of 104° C. and a melt flow index of 5.5 and 1 part of the ethylene-vinylacetate copolymer employed in Example 10 as the film-forming resin. The polystyrene material of Example 1 was used as the foam-forming resin.

| Run | 11-1 | 11-2 |
|---|---|---|
| Film Layer #/hr | 1.0 | 0.6 |
| Temp., °C. | 149 | 149 |
| Foam Layer #/hr | 7.5 | 5.0 |
| Blowing Agent #/hr | F-12 0.75 | F-11 0.6 |
| Temp., °C. | 127 | 131 |
| Pressure psig | 2220 | 2120 |
| Die Thickness | 0.15 | 0.15 |
| Die Width | 1.0 | 1.0 |

EXAMPLE 12

A ten-layer film-foam structure was prepared using a blend of 10 parts low density polyethylene having a melt temperature of 104° C. and a melt flow index of 12.0 and 1 part of the ethylene-vinylacetate copolymer employed in Example 10 as the film-forming resin. The polystyrene material of Example 1 was used as the foam-forming resin.

| Run | 12-1 |
|---|---|
| Film Layer #/hr | 0.1 |
| Temp., °C. | 149 |
| Foam Layer #/hr | 5.0 |
| Blowing Agent | F-11 |
| #/hr | 0.6 |
| Temp., °C. | 131 |
| Pressure psig | 2060 |
| Die Thickness | 0.15 |
| Die Width | 1.0 |

EXAMPLE 13

Foam-film structures having 3 film and 2 foam layers were prepared employing a polystyrene having a melting temperature of 98° C. and a melt flow index of 6.0 to 9.0 as the foam-forming polymer. In runs 13-1 to 13-4 and 13-6, the film-forming polymer was identical to the foam-forming polymer and in runs 13-5 to 13-7, the film-forming polymer was a low density polyethylene having a melt temperature of 104° C. and a melt flow index of 2.0. In runs 13-6, 10 weight percent carbon black was blended into the polyethylene film-forming polymer. In runs 13-1 to 13-6, the blowing agent was a blend of chlorodifluoroethane and ethyl chloride, identified in the runs as CDFE/CE and in run 13-7, the blowing agent was azodicarbonamide and low density polyethylene, identified in the run as ADCA/PE. In runs 13-1, 13-2 and 13-3, a small amount of trichlorofluoromethane blowing agent identified as A-1, was incorporated into the film-forming polystyrene compositions. In runs 13-3 and 13-4, a small amount of ethyl chloride blowing agent, identified as A-2, was incorporated into the film-forming polystyrene compositions. The composite structures were extruded through a rectangular die having a thickness of 0.04 inch and a width of 1.0 inch, except for runs 13-5 and 13-6, which were extruded through a rectangular die having a thickness of 0.05 inch and a width of 3.0 inches. Excellent composition structures were obtained in all instances.

| Run | 13-1 | 13-2 | 13-3 | 13-4 | 13-5 | 13-6 | 13-7 |
|---|---|---|---|---|---|---|---|
| Film Layer Polymer | PS | PS | PS | PS | PE | PS[1] | PE |
| #/hr | 4 | 4 | 4 | 4 | 4 | 4 | .8 |
| Additive | A-1[2] | A-1[2] | A-2[3] | A-2[3] | | A-1[2] | |
| #/hr | .24 | .16 | .16 | .12 | | .24 | |
| Temp., °C. | 180 | 165 | 160 | 175 | 165 | 180 | 170 |
| Foam Layer Polymer | PS | PS | PS | PS | PS | PS | PS |
| #/hr | 15 | 15 | 15 | 15 | 20 | 15 | 4.7 |
| Blowing Agent | CDFE/CE | CDFE/CE | CDFE/CE | CDFE/CE | CDFE/CE | CDFE/CE | ADCA/PE |
| #/hr | 1.05/.525 | 1.05/.525 | 1.05/.525 | 1.05/.525 | 1.05/.525 | 1.05/.525 | .042/.099 |
| Temp., °C. | 126 | 126 | 124 | 124 | 126 | 122 | 160 |
| Pressure psig | 1370 | 1580 | 1340 | 1410 | 2000 | 1340 | 1330 |
| Die Thickness | 0.4 | 0.4 | 0.4 | 0.4 | 0.05 | 0.05 | 0.4 |
| Die Width | 1.0 | 1.0 | 1.0 | 1.0 | 3.0 | 3.0 | 1.0 |

[1]Composition contained 10 weight percent carbon black
[2]Trichlorofluoromethane
[3]Ethyl chloride It is understood that the above is merely representative of the preferred embodiment and that various changes can be made without departing from the spirit and broader aspects of the invention.

The embodiments of the invention in which an exclusive property or privilege is claimed are defined as follows:

1. A method for preparing a foam structure comprising at least two individual layers, at least one of said layers comprising an expanded cellular thermoplastic material, said layers being fused to, interdigitated with and in generally parallel relationship to each other, said method comprising:
    providing at least two separate melt streams, each of said melt streams comprising thermoplastic resinous material, each of said thermoplastic resinous material melt streams containing no expansion agent;
    incorporating, subsequent to the formation of said melt streams, into at least one of said separate melt streams at least one expansion agent, under a pressure which is sufficient to inhibit expansion of said melt stream;
    combining said separate melt streams to form a composite stream of interdigitated layers;
    expressing said composite stream and causing said melt stream having expansion agent incorporated therein to expand;
    controlling the process pressure and controlling process temperature of each individual melt stream during the expressing of said composite stream, (1) to prevent foam expansion prior to the expression of the composite stream, (2) to obtain a stable foam structure, and (3) to control the temperature of the interface of any two adjacent layers, at least one of said adjacent layers comprising a foam layer, so that it will neither be so hot immediately adjacent said interface as to collapse the foam cells immediately adjacent said interface, not so cold as to inhibit expansion of said at least one foam layer;
    said process temperature for said melt stream containing said expansion agent being in the range from 1.1 to 2.75 times, on the centigrade scale, the melt temperature of said melt stream containing said expansion agent, and said process temperature for said other of said melt streams being in the range from 0.75 to 2 times, on the centigrade scale, said processing temperature of said melt stream containing said expansion agent; and recovering an expanded cellular thermoplastic body comprising at least two interdigitated layers fused to and in generally parallel relationship to each other.

2. A method in accordance with claim 1 wherein said separate melts comprise dissimilar thermoplastic resinous materials.

3. A method in accordance with claim 1 wherein said separate melts comprise the same thermoplastic resinous material.

4. A method in accordance with claim 1 wherein each of said separate melt streams is divided into a plurality of substreams and said substreams are combined and interdigitated to form a composite stream.

5. A method in accordance with claim 1 wherein at least one expansion agent is incorporated into each of said separate melt streams.

6. A method in accordance with claim 1 wherein said thermoplastic resinous material has a glass transition temperature which is less than the process temperature of its respective melt stream.

7. A process according to claim 1 wherein at least one of said separate melt streams has incorporated therein at least one plasticizer for the thermoplastic resinous material.

8. A process according to claim 1 wherein the process pressure under which said expansion agent is incorporated into said at least one melt stream is at least 500 psig.

9. A process according to claim 8 wherein said process pressure is at least 500 psig.

10. A process according to claim 1 wherein the foaming temperature of said melt stream having incorporated therein at least one foaming agent is greater than the melt temperature of the other of said at least two separate melt streams.

11. A process according to claim 5 wherein the foaming temperature of each of said melt streams having blowing agent incorporated therein is greater than the melt temperature of its respective stream.

12. A method according to claim 1 wherein said expansion agent which is incorporated into at least one of said separate melt streams comprises a physical expansion agent.

13. A method according to claim 1 wherein said expansion agent which is incorporated into at least one of said separate melt streams comprises a chemical expansion agent.

14. A method according to claim 1 wherein at least one of said at least two separate melt streams has incorporated therein from 0.1 to 2.5 weight percent of carbon black.

15. A method for preparing a foam structure comprising at least two individual layers, at least one of said layers comprising an expanded cellular thermoplastic material, said layers being fused to, interdigitated with and in generally parallel relationship to each other, said method comprising:

providing at least two separate melt streams, each of said melt streams comprising thermoplastic resinous material, each of said thermoplastic resinous material melt streams containing no expansion agent;

incorporating, subsequent to the formation of said melt streams, into at least one of said separate melt streams from 1 to 100 parts by weight of at least one expansion agent per 100 parts of thermoplastic resinous material, under a pressure which is sufficient to inhibit expansion of said melt stream;

incorporating into at least one other of said separate melt streams from 0.1 to 1 part by weight of at least one expansion agent per 100 parts of thermoplastic resinous material, under a pressure which is sufficient to inhibit expansion of said melt stream;

combining said separate melt streams to form a composite stream of interdigitated layers;

expressing said composite stream and causing said melt stream having said 1 to 100 parts by weight of expansion agent incorporated therein to expand;

controlling the process pressure and controlling process temperature of each individual melt stream during the expressing of said composite stream (1) to prevent foam expansion prior to the expression of the composite stream, (2) to obtain a stable foam structure, and (3) to control the temperature at the interface of any two adjacent layers, at least one of said adjacent layers comprising a foam layer, so that it will neither be so hot immediately adjacent said interface as to collapse the foam cells immediately adjacent said interface nor so cold as to inhibit expansion of said at least one foam layer;

said process temperature for said melt stream containing said expansion agent being in the range from 1.1 to 2.75 times, on the centigrade scale, the melt temperature of said melt stream containing said expansion agent, and said process temperature for said other of said melt streams being in the range from 0.75 to 2 times, on the centigrade scale, said processing temperature of said melt stream containing said expansion agent; and recovering an expanded cellular thermoplastic body comprising at least two interdigitated layers fused to and in generally parallel relationship to each other.

16. A method according to claim 15 wherein said other of said separate melt streams has incorporated therein from 0.1 to 25 weight percent of carbon black.

17. A method according to claim 15 wherein at least one of said expansion agents comprises a physical expansion agent.

18. A method according to claim 15 wherein at least one of said expansion agents comprises a chemical expansion agent.

* * * * *